(12) United States Patent
Garg

(10) Patent No.: US 9,086,720 B1
(45) Date of Patent: Jul. 21, 2015

(54) DEVICE REMOTE CONTROL

(75) Inventor: Parag K. Garg, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 252 days.

(21) Appl. No.: 13/608,963

(22) Filed: Sep. 10, 2012

(51) Int. Cl.
 *G06F 1/00* (2006.01)
(52) U.S. Cl.
 CPC ........................................ *G06F 1/00* (2013.01)
(58) Field of Classification Search
 CPC .......... H04B 10/00; G06F 17/30; H04Q 9/00; H04Q 7/24; G06K 9/00
 See application file for complete search history.

(56) References Cited

U.S. PATENT DOCUMENTS

2007/0019958 A1 * 1/2007 Calhoon ........................ 398/106
2008/0165752 A1 * 7/2008 Perlman ........................ 370/338

* cited by examiner

*Primary Examiner* — Michael Faragalla
(74) *Attorney, Agent, or Firm* — Sutherland Asbill & Brennan LLP

(57) ABSTRACT

Described herein are systems and methods for determining infrared signaling codes used for controlling various media devices. The system may determine signaling codes based on user input in response to a graphical user interface, by receiving signals transmitted by a media device remote, or a combination thereof. When determined, a media controller remote control may receive commands from a media controller using a radio frequency interface and transmit particular signaling codes using infrared emitters to allow for control of the media devices.

23 Claims, 10 Drawing Sheets

| | |
|---|---|
| 702 | RECEIVE A REQUEST TO ADD CONTROL OF A MEDIA DEVICE TO A MEDIA CONTROLLER REMOTE |
| 704 | PRESENT A USER INTERFACE COMPRISING A PLURALITY OF PROMPTS CONFIGURED TO OBTAIN ONE OR MORE CHARACTERISTICS OF THE MEDIA DEVICE |
| 706 | RECEIVE USER INPUT FROM THE USER INTERFACE |
| 708 | DETERMINE A CODE TABLE BASED AT LEAST IN PART ON THE USER INPUT |
| 710 | SEND TO THE MEDIA CONTROLLER REMOTE AT LEAST A PORTION OF A CODE TABLE ASSOCIATED WITH THE MEDIA DEVICE |

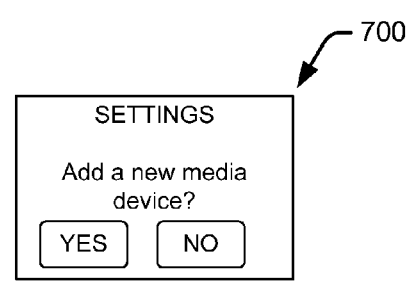
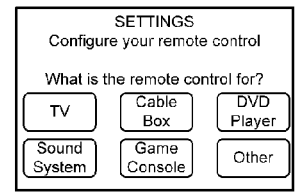
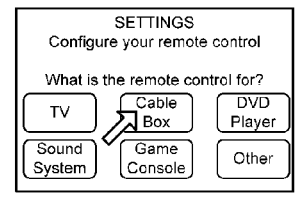
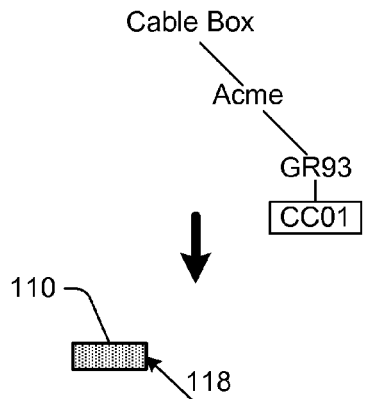
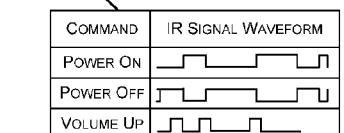

FIG. 7

DEVICE REMOTE CONTROL

BACKGROUND

A wide variety of content is available to users for access electronically. This content may include television programming, eBooks, music, movies, games, and so forth. The content may be delivered using broadcast, cable, satellite, Internet, playback from a local media device such as a digital versatile disk ("DVD"), compact disc ("CD"), flash memory, hard disk drive, and so forth.

Traditionally, each of these different pieces of content has involved a different media device to access or consume the content. As a result, in locations where content is consumed, such as a user's living room, home theater, conference room, and so forth, a bewildering assortment of media devices used to access this content may be found. For example, these different media devices may include, but are not limited to broadcast satellite receivers, broadcast radio receivers, cable television interface boxes, game consoles, DVD players, Blu-Ray™ players, CD players, audio systems, and so forth. Each of these different devices may present different user interfaces such as different remote controls and on-screen menus to users. This results in a user experience in which consumption of content is unnecessarily complicated.

BRIEF DESCRIPTION OF THE DRAWINGS

FIG. 7 illustrates a process of configuring the media controller remote to control a media device based at least in part on user inputs to a plurality of prompts to determine the media device.

Figure 1:
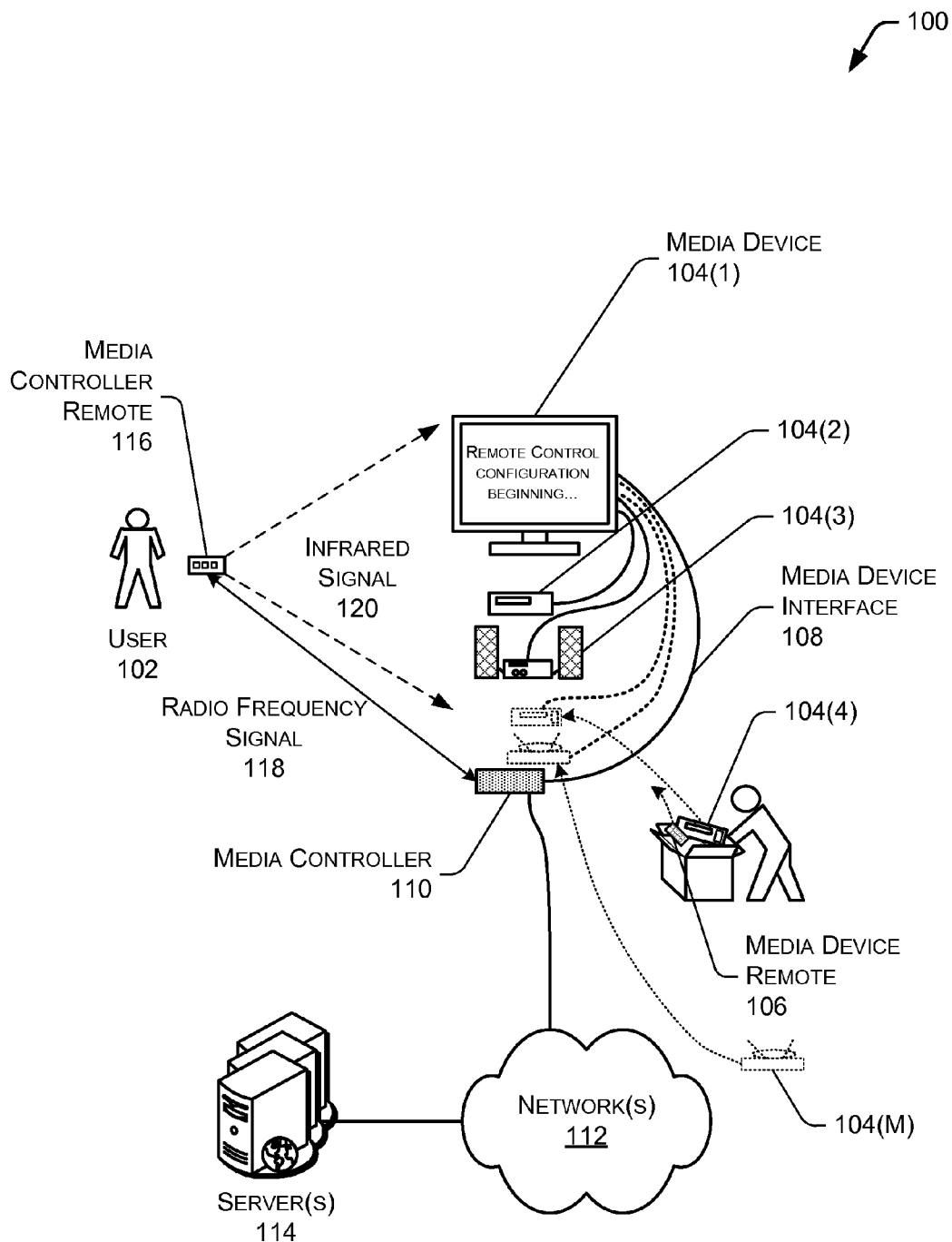
FIG. 1 illustrates a system including a media controller and a media controller remote configured to interface with one or more media devices.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A vast and ever growing collection of content is available for users to access. This content may include television programming, eBooks, music, movies, games, and so forth. The content may be delivered using broadcast, cable, satellite, Internet, playback from a local media device such as a digital versatile disk ("DVD"), compact disc ("CD"), flash memory, hard disk drive, and so forth.

As the collection of content grows the collection of media devices used to access this content grows as well. Traditionally, each piece of content has involved a different media device to access or consume. For example, a user's living room may contain media devices such as a television, a broadcast satellite receiver, a broadcast radio receiver, a sound system, a cable television interface box, a game console, and so forth.

Each of these different devices may present different user interfaces such as different remote controls and on-screen menus to users. Furthermore, as the mix of devices may vary between users, what is familiar to one user may be unfamiliar to another. This results in a user experience in which consumption of content may be complicated. For example, consider the scenario where a user wishes to watch a movie streamed from the Internet. This may involve tedious or complicated setup to allow for remote control of the media devices. Once configured, actual consumption of the content may involve dozens of steps such as turning on the various media devices in a particular order, selecting from several input sources on the television, selecting settings on the sound system, maneuvering through many menus to select a particular movie, and so forth. These steps may require issuing numerous commands to the devices, typically using one or more different media device remote controls. As a result, the overall user experience associated with consuming the content is unnecessarily unpleasant.

Described herein are devices and methods for configuring a media controller remote to control one or more media devices. Once configured, a media controller may use the media controller remote to control the one or more media devices. The media controller may be configured to provide centralized control and coordination for operation of the one or more media device.

The media controller remote is configured to communicate with the media controller, such as with a radio frequency interface. The media controller remote is configured to operate as an input/output device for the media controller. The media controller remote may also be configured to control one or more media devices, such as with an infrared ("IR") transmitter. The media controller remote may receive configuration information such as at least a portion of an infrared signaling code table from the media controller. With this infrared signaling code table, the media controller remote is able to generate infrared signals to control the one or more media devices.

The media controller may determine which infrared signaling code table to configure the media controller remote with based at least in part on one or more of user input, infrared signals captured by the media controller, or purchase information. For example, the media controller may present a user interface to query the user as to one or more characteristics of the media device. The user interface may query the user as to manufacturer, model, and so forth. Based at least in part on these characteristics, an infrared signaling code table associated with the user is determined and provided to configure the media controller remote. As a result, complicated manual programming is avoided. By easily configuring the media controller remote to control the one or more media devices, the user experience during setup and consumption of content is improved.

The media controller may be configured to control one or more of the media devices. For example, the media controller may be configured to set the television to a particular input source such as a cable television interface box. Some media devices may communicate with one another using media device interfaces such as a high-definition multimedia interface ("HDMI") connection using a feature set such as the Consumer Electronics Control ("CEC"), wireless local area network ("WLAN"), personal area network ("PAN") such as Bluetooth™, Zigbee, and so forth. This communication may include sending commands to the media devices. Continuing the example, where the media device interface provides for the functionality, the television coupled to the media device interface may be configured by the media controller to switch to the input source corresponding to the cable television interface box.

While media devices may have these media device interfaces available, virtually all media devices are configured to accept infrared commands, such as from a media device remote. As described in this application, the media controller remote may be configured to transmit infrared commands configured to control the one or more media devices. One or more commands may be generated by the media controller and sent to the media controller remote for transmission. Because the media controller remote is typically used by the user in front of the media devices, the infrared signal transmitted by the media controller remote may be received by the media devices. As a result, the media controller is able to control the one or more media devices. This enables the user to experience a common user experience as provided by the media controller while still operating and consuming content provided by the various media devices.

Illustrative System

FIG. 1 illustrates a system 100 for presenting content to one or more users for consumption. The content may include television programming, movies, eBooks, audiobooks, music, audio, games, and so forth. The content may be delivered using broadcast, cable, satellite, network such as the Internet, playback from a local media device such as a digital versatile disk ("DVD"), compact disc ("CD"), flash memory, hard disk drive, and so forth. A single user 102 is shown, however more than one user 102 may consume content at a given time. For example, several users 102 may watch a movie or play a game together.

One or more media devices 104 are illustrated. These media devices 104(1), 104(2), . . . , 104(M) may include televisions, display devices, broadcast satellite receivers, broadcast radio receivers, cable television interface boxes, game consoles, DVD players, CD players, and so forth. For example, as shown here the system 100 comprises a television media device 104(1), a DVD player media device 104(2), and a sound system media device 104(3). Over time users may add or remove media devices 104 to the system 100. For example, the user 102 may add a cable television interface box media device 104(4), and other media devices 104(M). One or more of the media devices 104 may be configured to operate in conjunction with a media device remote 106. The media device remote 106 may be configured to accept input from the user 102 such as a key press and generate a command for an associated media device 104 such as an infrared signal. For example, the cable television interface box 104(4) may include a media device remote 106 allowing the user to change channels, view an electronic program guide, and so forth. The media device remote 106 may be configured to communicate with the media device 104. This communication may use an infrared interface. For example, the media device remote 106 may transmit an infrared signal corresponding to a particular command using an infrared light emitting diode (LED) and the associated media device 104 may receive the infrared signal with an infrared detector such as a photodetector.

The media devices 104 may be coupled to one another with a media device interface 108. The media device interface 108 may comprise a high-definition multimedia interface ("HDMI") connection using a feature set such as the Consumer Electronics Control ("CEC"), local area network ("LAN"), wireless local area network ("WLAN"), personal area network ("PAN") such as Bluetooth™, and so forth. In some implementations, the media device interface 108 may use a wired bus or common set of wireless protocols allowing for the media devices 104 on the media device interface 108 to receive communication from other media devices 104. For example, a command interchange between a DVD player and a television may also be "overheard" and received by the sound system 104(3).

The media device interface 108 may transfer data in analog, digital, or combined analog and digital data formats. The data may include image data, audio data, control data, and so forth. For example, the television media device 104(1) may receive a video stream using the media device interface 108 from the DVD player 104(2).

Instead of or in addition to content-related information such as audio and video, communication between the media devices 104 may include status information, commands, and so forth. For example, when the cable television interface box 104(4) powers on, it may send a power up status message across an HDMI media device interface 108. In another example, a command may be sent along the media device interface 108 to the television 104(1) to select a particular video input.

As described above, the many media devices 104 available to present content to the user 102 may be complicated to control. A media controller 110 may be connected to the one or more media devices 104, such as using one or more of the media device interfaces 108. The media controller 110 may be configured to provide a user interface to the user 102, receive status information about the one or more media devices 104 using the media device interfaces 108, issue commands to one or more of the media devices 104, present content, and so forth. For example, the media controller 110 may be configured to provide a user interface to the user 102 and generate commands allowing for the operation of the one or more media devices 104.

The media controller 110 and one or more of the media devices 104 may be configured to couple with communication interfaces to one or more networks 112. The network 112 may comprise one or more private networks, public networks such as the Internet, or a combination of both configured to transfer data between two or more devices. The media controller 110 is discussed in more detail below with regard to FIG. 2.

One or more servers 114 or other remote devices are coupled to the network 112. The server 114 may provide various services to the media controller 110, the one or more media devices 104, or combinations thereof. The services may include, but are not limited to storage of content, streaming content, indexing of content, control, programming, and so forth. For example, the server 114 may provide a web based interface accessible by the user 102 when located remotely from the media controller 110 to allow for control or configuration of the media controller 110 over the network 112. In another example, the server 114 may provide a video stream to the media controller 110 or the media device 104 for presentation.

A media controller remote 116 may be used in conjunction with the media controller 110. The media controller remote 116 is a portable input/output device. The media controller remote 116 may be provided in a variety of form factors such as a tablet, slate, generally rectangular cuboid configured for single-handed use, wand, and so forth. The media device remote 106 and the media controller remotes 116 are depicted in this disclosure as generally rectangular cuboids for convenience of illustration and not by way of limitation. The form factors, sizes, and so forth may differ between the media controller remote 116 and various media device remotes 106. For example, the media device remote 106 may be a generally rectangular cuboid configured for single-handed use while the media controller remote 116 comprises a tablet shape.

The media controller remote 116 is configured to communicate with the media controller 110. Communication between the media controller remote 116 and the media controller 110 may use a wired or wireless connection. The wired connection may comprise an optical fiber, electronic conductor, or other physical coupling between the media controller remote 116 and the media controller 110. The wireless connection may comprise optical, acoustic, electromagnetic, or other means to transmit information between the media controller remote 116 and the media controller 110. In one implementation the wireless connection comprise radio frequency ("RF") signals 118.

Communication between the media controller remote 116 and the media controller 110 may use a proprietary protocol, standard protocol, or a combination thereof. For example, the media controller remote 116 and the media controller 110 may comprise RF interfaces compliant with the Bluetooth™ standard. Communication between the media controller remote 116 and the media controller 110 may be bidirectional or unidirectional.

The media controller remote 116 may also be configured to generate wireless signals for communication with the one or more media devices 104. In some implementations, the media controller remote 116 may comprise one or more infrared emitters configured to generate infrared signals 120. For example, the infrared signals 120 may use infrared light with wavelengths of about 940 nm such as generated by an infrared LED.

The infrared signals 120 may convey information by modulating the infrared light. This modulation results in a change in the infrared signals over time, which may be visualized as a waveform. The waveform of the modulated infrared signal thus encodes in the infrared signal the information being transmitted, such as a command. In one implementation, pulse width modulation ("PWM") may be used to generate a particular infrared signal. For example, signals may be pulse width modulated at a frequency of 37 kilohertz. The particular PWM frequency and waveform may correspond to a particular command for a particular media device 104. The media controller remote 116 is discussed in more detail below with regard to FIG. 3.

An infrared signaling code table or other data structure may be used by the media controller 110 to associate a particular command with a particular infrared signal waveform. For example, the infrared signaling code table may indicate that for a television media device 104(1) manufactured by Initech, model TPS12, a "power on" command comprises a signal with a pulse width modulation frequency of 50 kHz and a waveform of on for 2 milliseconds (ms), off for 5 ms, on for 6 ms, off for 2 ms, and on for 1 ms. The association between media devices 104 and the code table is described below in more detail with regard to FIGS. 4 and 5.

In some implementations, the infrared signals 120 may also be used to communicate with the media controller 110. For example, the infrared signals 120 may be received by the media controller 110 and interpreted to indicate orientation of the media controller remote 116.

Figure 2:
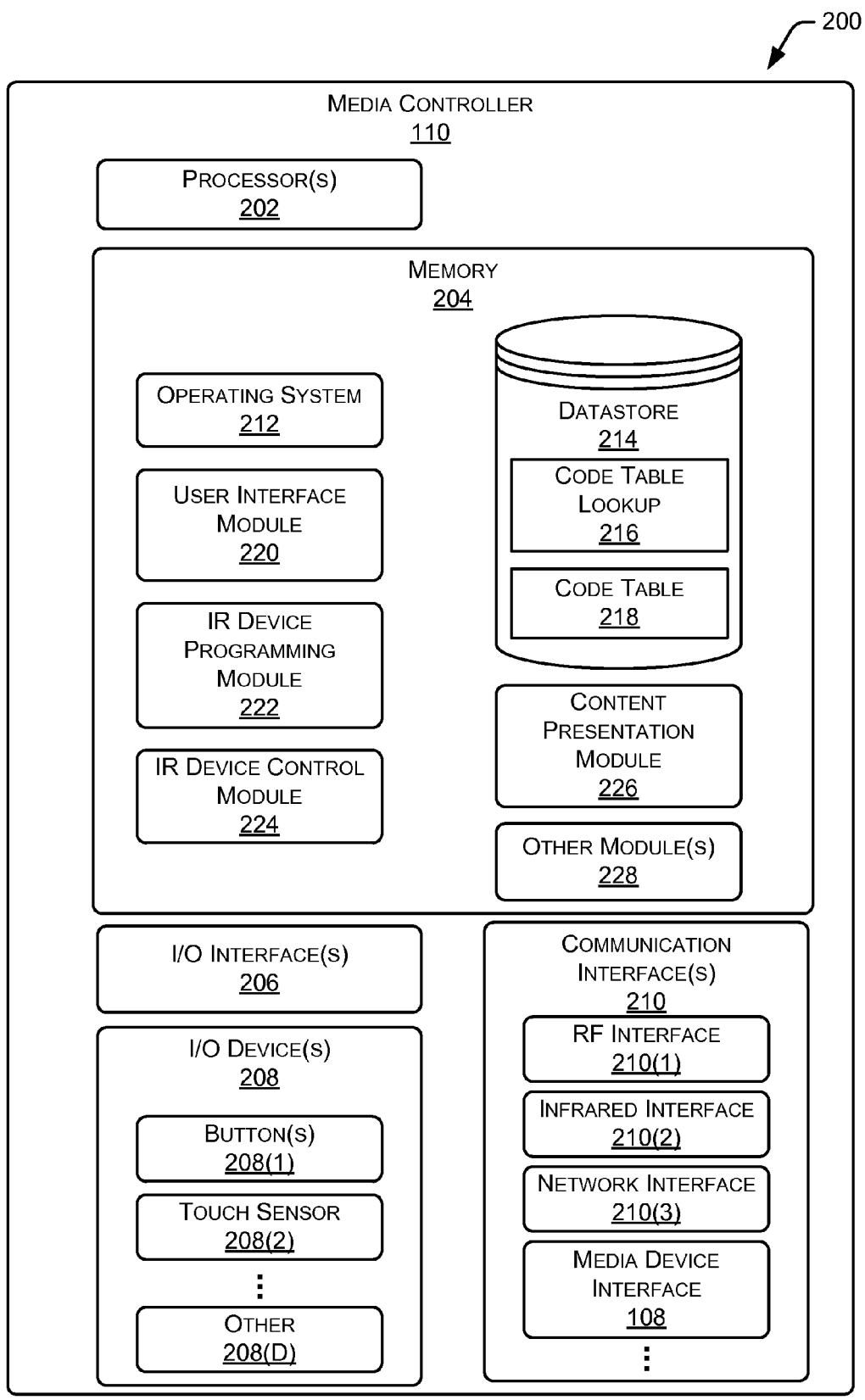
FIG. 2 illustrates a block diagram of a media controller configured to program a media controller remote to send commands to the one or more media devices.

FIG. 2 illustrates a block diagram 200 of the media controller 110 which may be configured to program the media controller remote 116 to control one or more media devices 104. The media controller 110 may comprise one or more processors 202, one or more memories 204, one or more input/output ("I/O") interfaces 206, one or more I/O devices 208, and one or more communication interfaces 210.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The one or more I/O interfaces 206 allow for coupling I/O devices 208 to the media controller 110. The I/O interfaces 206 may comprise inter-integrated circuit ("I2C"), serial peripheral interface bus ("SPI"), universal serial bus ("USB"), RS-232, RS-432, and so forth. The I/O devices may include buttons 208(1) such as in keypads or keyboards, or touch sensors 208(2). The buttons 208(1) may include mechanical buttons, softkeys, keys with integrated displays, and so forth. The touch sensors 208(2) may comprise interpolating force sensing resistor ("IFSR") arrays, capacitive sensors, optical touch sensors, and so forth.

One or more other I/O devices 208(D) such as speakers, microphones, displays, external memory devices, global positioning system receivers, and so forth may also be coupled to the media controller 110 using the I/O interfaces 206.

The one or more communication interfaces 210 provide for the transfer of data between the media controller 110 and other devices such as the media controller remote 116, the servers 114, and so forth. The communication interfaces 210 may include, but are not limited to, PANs, wired local area networks ("LANs"), wireless local area networks ("WLANs"), wireless wide area networks ("WWANs"), and so forth. As shown here, the communication interfaces 210 may comprise one or more RF interfaces 210(1), one or more infrared interfaces 210(2), one or more network interfaces 210(3), one or more media device interfaces 108, one or more other interfaces, or a combination thereof.

The RF interface 210(1) may comprise a radio transmitter, radio receiver, or radio transceiver. The RF interface 210(1) may be compliant with one or more standard protocols, such as the Bluetooth™ PAN. The infrared interface 210(2) may comprise an infrared transmitter, infrared receiver, or an infrared transceiver. In some implementations the infrared interface 210(2) of the media controller 110 may consist of the infrared receiver and omit the infrared transmitter. As described below, an infrared transmitter in the media controller remote 116 may be used to generate infrared signals 120 for controlling one or more of the media devices 104.

The network interface 210(3) may be configured to connect the media controller 110 wired or wirelessly to one or more networks 112. These networks may include a LAN, WAN, WLAN, WWAN, and so forth. For example, the network interface 210(3) may comprise a transceiver and other devices configured to be compliant with the Institute of Electrical and Electronics Engineers ("IEEE") 802.11 standards. The network interface 210(3) may include a transceiver and other devices configured to be compliant with WWAN networks provided by one or more cellular carriers. For example, the network interface 210(3) may be configured to cellular data networks such as those based on the IEEE 802.16 standards such as WiMax.

The communication interface 210 of the media controller 110 may also comprise the media device interface 108 as described above. For example, several HDMI connections may be supported to allow coupling to one or more of the media devices 104 such as the television media device 104(1) to present a graphical user interface, or the sound system media device 104(3) to present an audible user interface.

In other implementations other devices or components may be coupled to or incorporated within the media controller 110. For example, digital rights management ("DRM") devices may be provided to control access to content.

The one or more memories 204 may store code or program instructions for execution by the processor 202 to perform certain actions or functions. In some implementations at least a portion of the instructions may be stored in external memory accessible to the media controller 110, such as on the server 114.

These instructions in the one or more memories 204 may include an operating system 212. The operating system 212 is configured to manage hardware resources such as the I/O interfaces 206 and provide various services to applications executing on the processor 202.

The one or more memories 204 may also store a datastore 214 containing information about the operating system 212, configuration files, code table lookup 216 data, infrared signaling code tables 218 (or "code tables"), and so forth. The datastore 214 may comprise a database, flat file, linked list, or other data structure. The code table lookup 216 and the code tables 218 are discussed in more detail below with regard to FIGS. 4 and 5.

A user interface module 220 is configured to provide a user interface for presentation to the user 102. For example, the user interface module 220 may generate images of a graphical user interface comprising elements such as menus and prompts for presentation on a display such as the television media device 104(1). In another example, the user interface module 220 may generate audible prompts for presentation using the sound system media device 104(3). The user interface module 220 may also be configured to accept input from the user 102. For example, the user interface module 220 may be configured to interpret input from the media controller remote 116 as selecting a particular element of the graphical user interface.

An infrared device programming module 222 is configured to determine a code table 218 associated with the media device 104, the media device remote 106, or both. When no code table 218 is available, the infrared device programming module 222 may build a code table 218. In some implementations, once built, this code table 218 may be provided to the server 114 and distributed to other media controllers 110. For example, upon adding a media device 104(4), the media controller 110 may identify the device and retrieve the code table 218 from the server 114. In another implementation code tables 218 and other information may be shared between media controllers 110, such as in a peer-to-peer configuration.

The infrared device programming module 222 may determine one or more characteristics about the media device 104, the media device remote 106, or both. These characteristics may be obtained through a user interface generated by the user interface module 220. For example, the user 102 may be presented with a graphical user interface using the television media device 104(1) to select a particular make and model of the media device 104. In another implementation, one or more characteristics may be obtained without user intervention from information received at the communication interfaces 210, such as the infrared signals 120 generated by one or more of the media device remotes 106 using the infrared interface 210(2) of the media controller 110. By analyzing these infrared signals 120, the media device 104, the media device 106, or both may be determined. The determination process is described below in more detail with regard to FIGS. 5-8.

To provide for infrared remote control, once determined, at least a portion of that code table 218 may be sent to the media controller remote 116 using a radio signal 118 generated by the RF interface 210(1). With the code table 218, the media controller remote 116 is able to control the associated media device 104 using the infrared signals 120. Furthermore, the media controller remote 116 has been configured for operation with little or no user intervention, improving the overall user experience.

An infrared device control module 224 may also be stored in the memory 204. As described above, some media devices 104 may not support control over the media device interface 108. The infrared device control module 224 is configured to generate commands for controlling one or more of the media devices 104 and sending the commands to the media controller remote 116 for transmission as infrared signals 120. This process is discussed below in more detail below with regard to FIG. 9.

The media controller 110 may also be configured to present content. A content presentation module 226 may be stored in the memory 204. The content presentation module 226 is configured to present for consumption at least a portion of content to the users 102 using the I/O interfaces 206, the communication interfaces 210, or both. For example, the content presentation module 226 may be configured to retrieve a video stream from the server 114 using the network 112 and output the video stream or a rendering thereof out the media device interface 210(4) to the television media device 104(1) for presentation.

Other modules 228 may also be stored in the memory 204. For example, a user authentication module may be configured to authenticate the user 102 to determine what content is accessible to the user 102.

Figure 3:
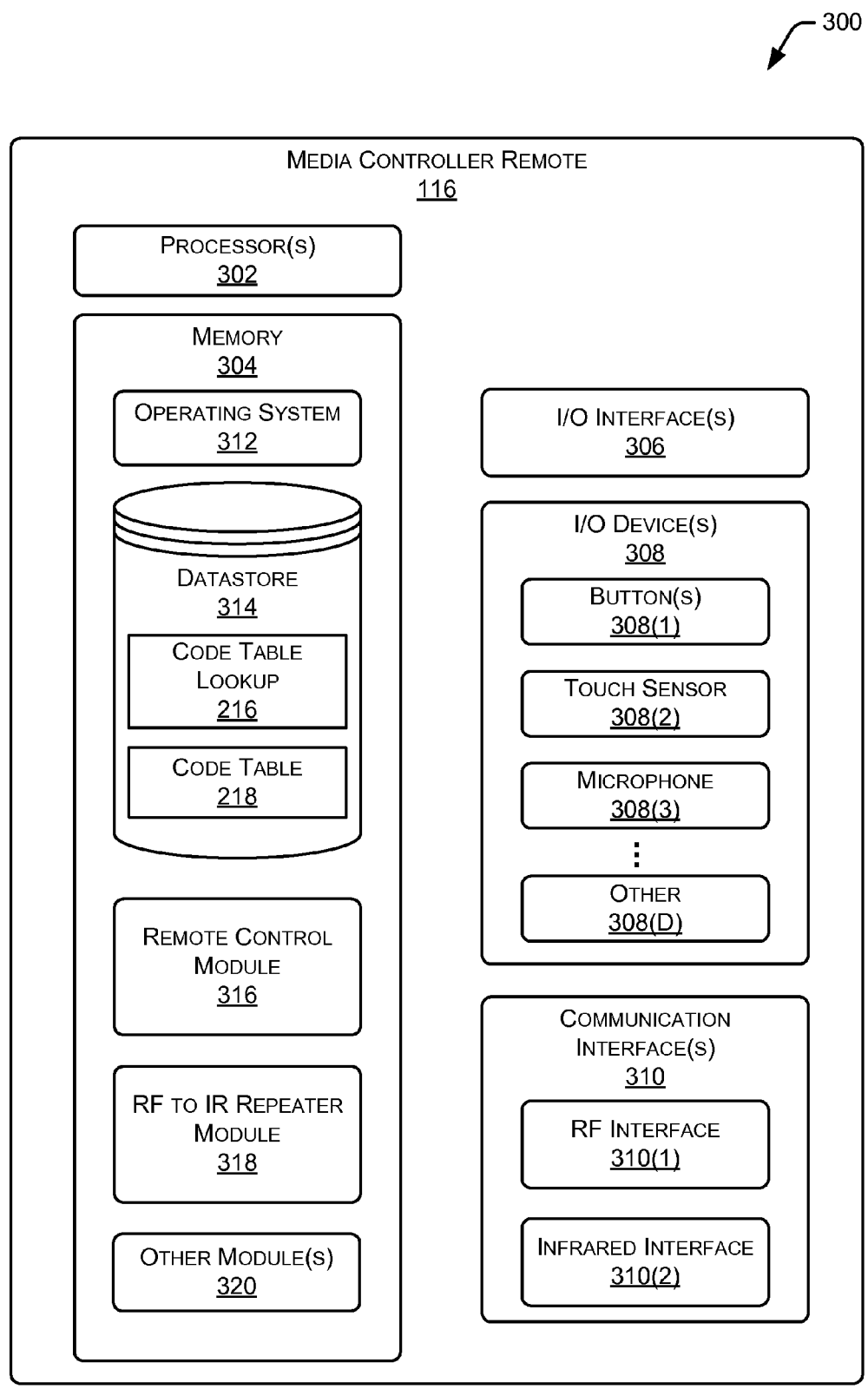
FIG. 3 illustrates a block diagram of a media controller remote configured to send infrared commands to the one or more media devices.

FIG. 3 illustrates a block diagram 300 of the media controller remote 116. As described above, the media controller remote 116 may be used to control the media controller 110 and may be configured to control at least some of the one or more media devices 104. Similar to the media controller 110 described above, the media controller remote 116 may comprise one or more processors 302, one or more memories 304, one or more I/O interfaces 306, one or more I/O devices 308, and one or more communication interfaces 310.

The I/O devices 308 may include one or more buttons 308(1), touch sensors 308(2), microphones 308(3), and other I/O devices 308(D). The other I/O devices 308(D) may include, but are not limited to accelerometers, gyroscopes, light sensors, haptic output devices configured to provide a vibrotactile output, speakers, or digital light projectors.

The communications interfaces 310 may include an RF interface 310(1) and an infrared interface 310(2). These interfaces may be similar to the RF interface 210(1) and the infrared interface 210(2) described above with regard to FIG. 2. In some implementations, the infrared interface 310(2) may consist of an infrared transmitter.

The memory 304 may store an operating system module 312 and a datastore 314 similar to that described above. The datastore 314 may store at least a portion of one or more code tables 218 as provided by the infrared device programming module 222 of the media controller 110. In some implementations, the datastore 314 may include the code table lookup 216 information as well.

A remote control module 316 is configured to generate commands for transmission by the infrared interface 310(2). The commands transmitted by the infrared interface 310(2) are based at least in part on the code table 218. The commands may be automatically initiated or manually initiated. For example, the automatically initiated commands may be a previously scheduled process executing on the processor 302 at a particular time. In another example, the automatically initiated commands may be triggered by a particular event such as a change in an ambient light level measured by the light sensor.

Manually initiated commands include those resulting from the user 102 entering an input using one or more of the I/O devices 308. For example, the user 102 may press a button 308(1) on the media controller remote 116 which is assigned the command to power on the television media device 104(1).

An RF to infrared repeater module 318 may be stored in the memory 304. The RF to infrared repeater module 318 is configured to accept input from the RF interface 310(1) as received from the media controller 110 and transmit one or more infrared signals 120 using the infrared interface 310(2). For example, the media controller 110 may generate commands to power off all media devices 104. These commands may be sent to the media controller remote 116 which transmits the infrared signals 120 corresponding to the "power off" commands.

The RF to infrared repeater module 318 may translate the commands from the media controller 110 and generate infrared signal waveforms to transmit using the infrared interface 310(2), or may pass-through infrared signal waveforms generated by the media controller 110. For example, the media controller 110 may send a "power off the television" command that is comprehensible by the media controller remote 116 but not specific to the television media device 104(1). The media controller remote 116 may receive this command and, using the code table 218, generate the appropriate infrared signal 120 for transmission to turn off the television media device 104(1).

In comparison, the infrared signal waveforms associated with the commands may be generated by the media controller 110 and received at the RF interface 310(1). These infrared signal waveforms may be passed through to the infrared interface 310(2) which transmits the infrared signals 120. In this pass-through mode, because the media controller 110 is generating the infrared signal waveform, the code table 218 for the associated media device 104 being signaled may not be present in the memory 304 of the media controller remote 116.

One or more other modules 320 may also be present in the memory 304. For example, a speech recognition module, biometric identification module, and so forth may be stored in the memory 304 and executed at least in part on the processor 302.

Figure 4:
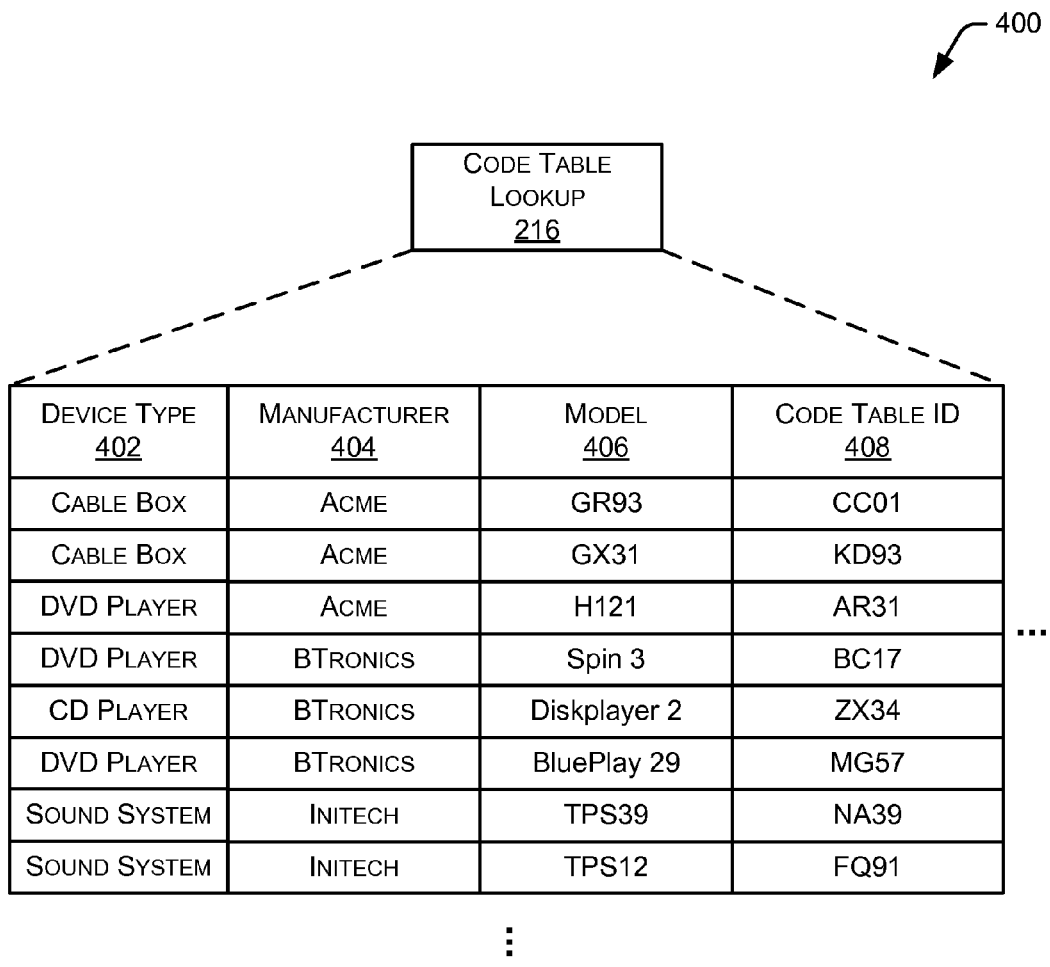
FIG. 4 illustrates a code table lookup associating media devices with a particular infrared code table.

FIG. 4 illustrates one implementation 400 of the code table lookup 216 which associates a particular media device 104 with a particular code table identifier. This code table identifier may be used to retrieve a particular code table 218. Although this and subsequent illustrations describe tables, other data structures may be used to store the information described. For example, the information may be stored as arrays, trees, heaps, graphs, and so forth.

The media devices 104 may include infrared receivers configured to accept commands transmitted as infrared signals 120 from media device remotes 106. Different manufacturers of media devices 104, as well as different models of media devices 104 may use different signal codes comprising different infrared waveforms. For example, for the same command such as "power on" command, the pulse width modulation frequency of the infrared signals 120, as well as the pulse spacing and duration may vary between manufacturers or media devices 104. The code table lookup 216 associates a particular media device 104 with a code table identifier which then may be used to retrieve the particular code table 218 for the particular media device 104.

In this illustration, the code table lookup 216 comprises attributes describing one or more characteristics of the media device 104. These attributes may include a device type 402, a manufacturer 404, a model 406, and a code table identifier 408. The device type 402 may indicate a category of the device, such as television, cable box, DVD player, sound system, game console, and so forth. The manufacturer 404 identifies the builder or marketer of a particular media device 104. For example, the manufacturers may be "Acme," "BTronics," "Initech," and so forth. The model 406 indicates a particular media device, such as model "GR93" made by Acme or "Diskplayer 2" made by BTronics. In other implementations, the code table lookup 216 may include other attributes. For example, the other attributes may include production year, physical description, picture, particular installed options present, and so forth.

The code table identifier 408 attribute provides a reference to a particular code table 218. By way of illustration only, and not as a limitation, the code table identifier 408 comprises an alphanumeric string such as "CC01." In other implementations the code table identifier 408 may be numeric, text, binary, and so forth. The code table 218 is described in more detail next with regard to FIG. 5.

Figure 5:
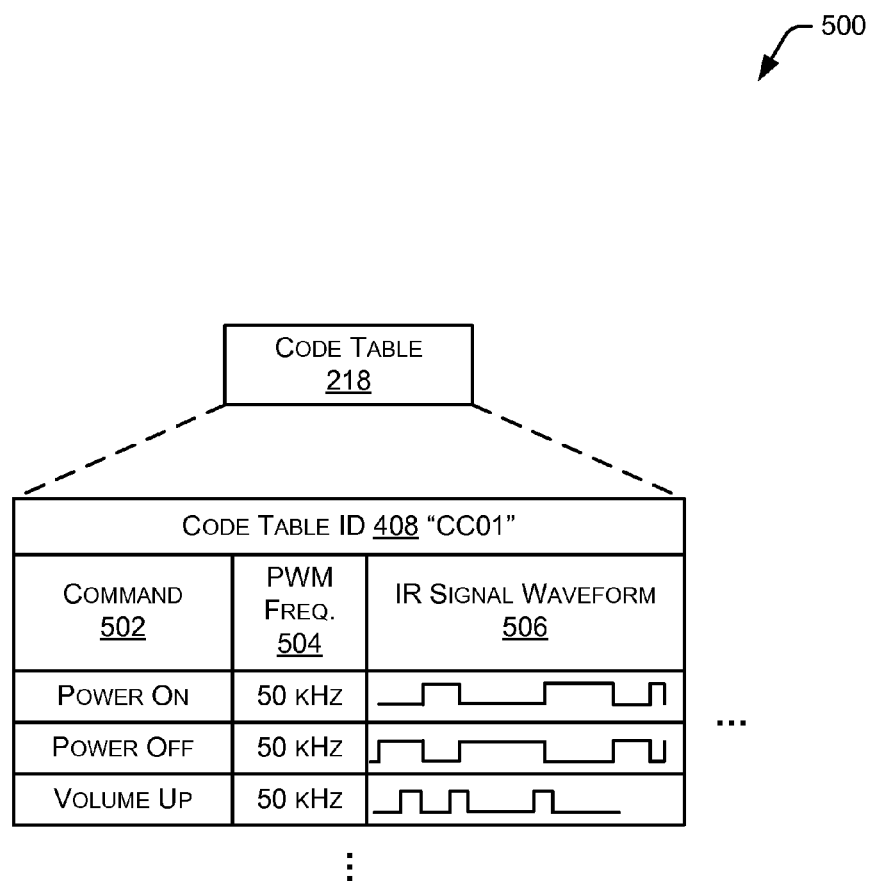
FIG. 5 illustrates the code table describing infrared signal waveforms associated with commands for the media device.

FIG. 5 illustrates one implementation 500 of the code table 218. The code table 218 may be pre-defined, or in some implementations may be generated with a learning process. For example, when no code table 218 is available for a particular device or a code table 218 is incomplete, the user 102 may be prompted by the media controller 110 to activate particular controls on the media device remote 106 while the media controller 110 receives and stores the resulting infrared waveforms. Based on the user prompts to activate the controls and the received waveforms, a code cable 218 for the media device 104 may be generated.

In this illustration, the code table associated with the code table identifier 408 of "CC01" is depicted. The code table 218 illustrated comprises attributes including a command 502, a pulse width modulation frequency 504, and an infrared signal waveform 506. In other implementations, the code table 218 may include different attributes. For example, an attribute indicating an infrared frequency or wavelength may be present.

The command 502 is associated with a particular function or action by the media device 104 and is configured to, when provided to the corresponding media device 104, control that media device 104. For example, as shown here the commands include "power on," "power off," "volume up," and so forth. The media device 104 is configured to, upon receiving one or more of these commands 502, perform the action such as turning the device on, off, increasing audio volume, and so forth.

As described above, the infrared signals 120 may use pulse width modulation ("PWM"). This may be done to reduce interference from ambient light, other infrared transmitters, and so forth. The code table 218 may include a PWM frequency 504 associated with the command 502. The PWM frequency is associated with modulation of an infrared emitted.

The code table 218 also includes a description or representation of an overall infrared signal waveform 506 which encodes the command 502. For example, the waveform infrared signal waveform 506 associated with the command 502 for the powering on the device may be described as sending an infrared signal 120 which is on for 2 milliseconds (ms), off for 5 ms, on for 6 ms, off for 2 ms, and on for 1 ms. The infrared signal waveform 506 may be expressed as a binary value, string, bitmap, Fourier function, and so forth.

Illustrative Processes Configuring Media Controller Remote

Figure 6:
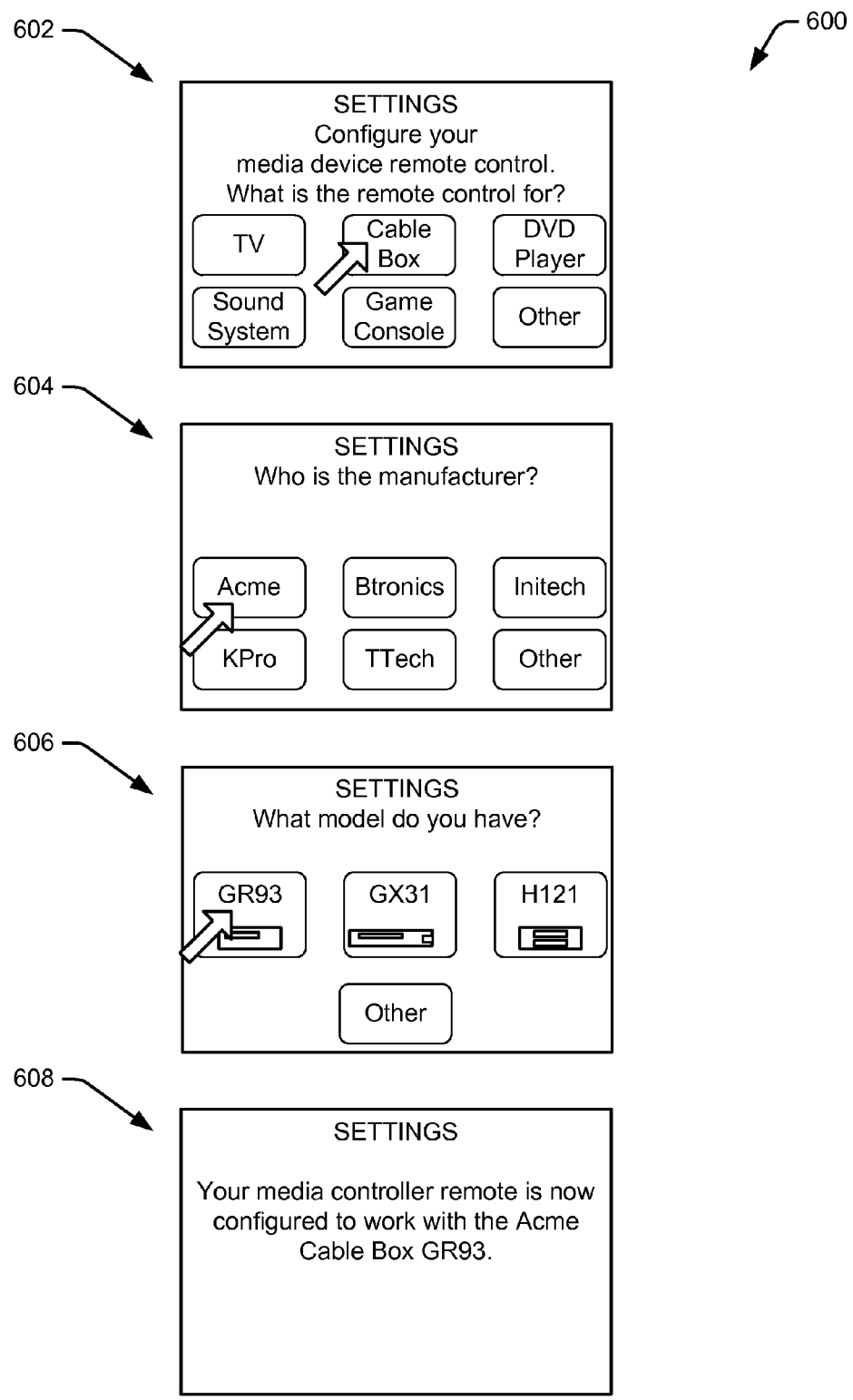
FIG. 6 illustrates a user interface for configuring the media controller remote to control one or more media devices by presenting a plurality of prompts.

FIG. 6 illustrates a user interface 600 for configuring the media controller remote 116 to control one or more media devices 104. As described above, the user interface module 220 of the media controller 110 may be configured to provide the user interface 600 for presentation, such as using the television media device 104(1).

The user 102 may add a media device 104 to the system 100. Instead of using the media device remote 106 to control the media device 104, the user 102 may wish to control the media device 104 using the media controller remote 116. As described above, different media devices 104 may use different infrared signals 120 to correspond to different commands. The user interface 600 may be presented to guide the user 102 in identifying the media device 104 with a plurality of prompts. These prompts are elements which are presented to the user and may elicit some action or response by the user 102. These elements may be output-only such as text presented on the television media device 104(1) saying "press the power on button on your media device remote" or may provide an ability to receive user input, such as with a dialog box or user-selectable object onscreen. Once identified, the infrared device programming module 222 may use the code table lookup 216 to determine the code table 218 associated with the media device 104.

The identification of the media device 104 may vary in scope depending upon the implementation. For example, the media device 104 may be narrowly identified down to a particular model number with specific options installed, or broadly identified such as being made by a particular manufacturer.

At 602, the media controller 110 presents the user interface 800 using the television media device 104(1) requesting the user 102 to select the device type 402. The media controller 110 may accept input from the media controller remote 116. For example, the user 102 may use buttons 308(1) to generate user input which selects the "cable box" device type 402.

At 604, at least partly in response to the user input, the user interface 600 now presents a list of manufacturers, such as those associated with the "cable box" device type 402. For example, the manufacturer "XYZ Corporation", which does not manufacture cable boxes may be omitted from presentation. As above, the media controller 110 may accept input using the media controller remote 116. For example, the user 102 may use buttons 308(1) to generate user input which selects the "Acme" manufacturer 404.

At 606, at least partly in response to the user input, the user interface 600 now presents a list of cable box models. In some implementations this list may include text, pictures of the media devices 104, or other information. As above, the media controller 110 may accept input using the media controller remote 116. For example, the user 102 may use buttons 308(1) to generate user input which selects the "GR93" model 406.

At 608, at least partly in response to the user input, indicates the configuration is complete. In some implementations, a confirmation or user interface configured to allow the user 102 to test the configuration may be provided.

The configuration may comprise the infrared device programming module 222 using the code table lookup 216 to determine the code table 218 associated with the media device 104. In this example, the code table 218 associated with "GR93" is code table "CC01." The infrared device programming module 222 may then provide at least a portion of this code table 218 to the media controller remote 116 using the RF interface 210(1). This code table 218, or portion thereof, may be used to configure the media controller remote 116 to generate the appropriate infrared signals 120 to control the media device 104. This process is discussed in more detail below with regard to FIG. 7.

FIG. 7 illustrates a process 700 of the media controller 110 configuring the media controller remote 116 to control the media device 104 based at least in part on user inputs to a plurality of prompts. This process may be implemented at least in part by the infrared device programming module 222.

Block 702 receives a request to add control of a media device 104 to the media controller remote 116. For example, the user interface module 220 may present on the television media device 104(1) a prompt to the user 102 to accept to begin configuration.

Block 704 presents the user interface 600 comprising a plurality of prompts configured to obtain one or more characteristics of the media device 104 to be added. The prompts may comprise controls provided in the user interface 600 which are configured to accept user input. For example, the prompts may comprise on-screen buttons the user 102 can select. The one or more characteristics may comprise device type, manufacturer, model, production year, physical description, picture of the media device, and so forth.

Block 706 receives user input from the user interface 600. As described above, the user input may be received using the I/O devices 308 of the media controller remote 116. For example, the user 102 may use the one or more buttons 308(1) to select the device type, manufacturer, model, and so forth.

Block 708 determines the code table 218 associated with the media device 104, based at least in part on the user input. This determination may comprise comparing the one or more characteristics with the data in the code table lookup 216. For example, the code cable 218 of "CC01" is associated with the media device 104 based at least in part on the user input of "cable box," "Acme," and "GR93." As part of the determination data stored in a remote resource such as the server 114 may be accessed. For example, at least a portion of the user input may be provided to the server 114 which queries a database based at least in part on the user input to determine the media device 104, the code table 218, or both.

Block 710 sends the media controller remote 116 at least a portion of the code table 216 associated with the media device 104. As described above, the code table 216 or portion thereof may be sent from the media controller 110 to the media controller remote 116 using a radio frequency signal 118 generated by the RF interface 210(1).

FIGS. 6 and 7 describe receiving information about the one or more characteristics of the media device 104 from the user 102 by providing a plurality of prompts in a user interface. As described next in FIG. 8, in some implementations the one or more characteristics may be determined by the media controller 110 without the knowledge of the user 102 of the one or more characteristics. For example, the user may not know the manufacturer, model, and so forth yet still use the media controller 110 to configure the media controller remote 116.

Figure 8:
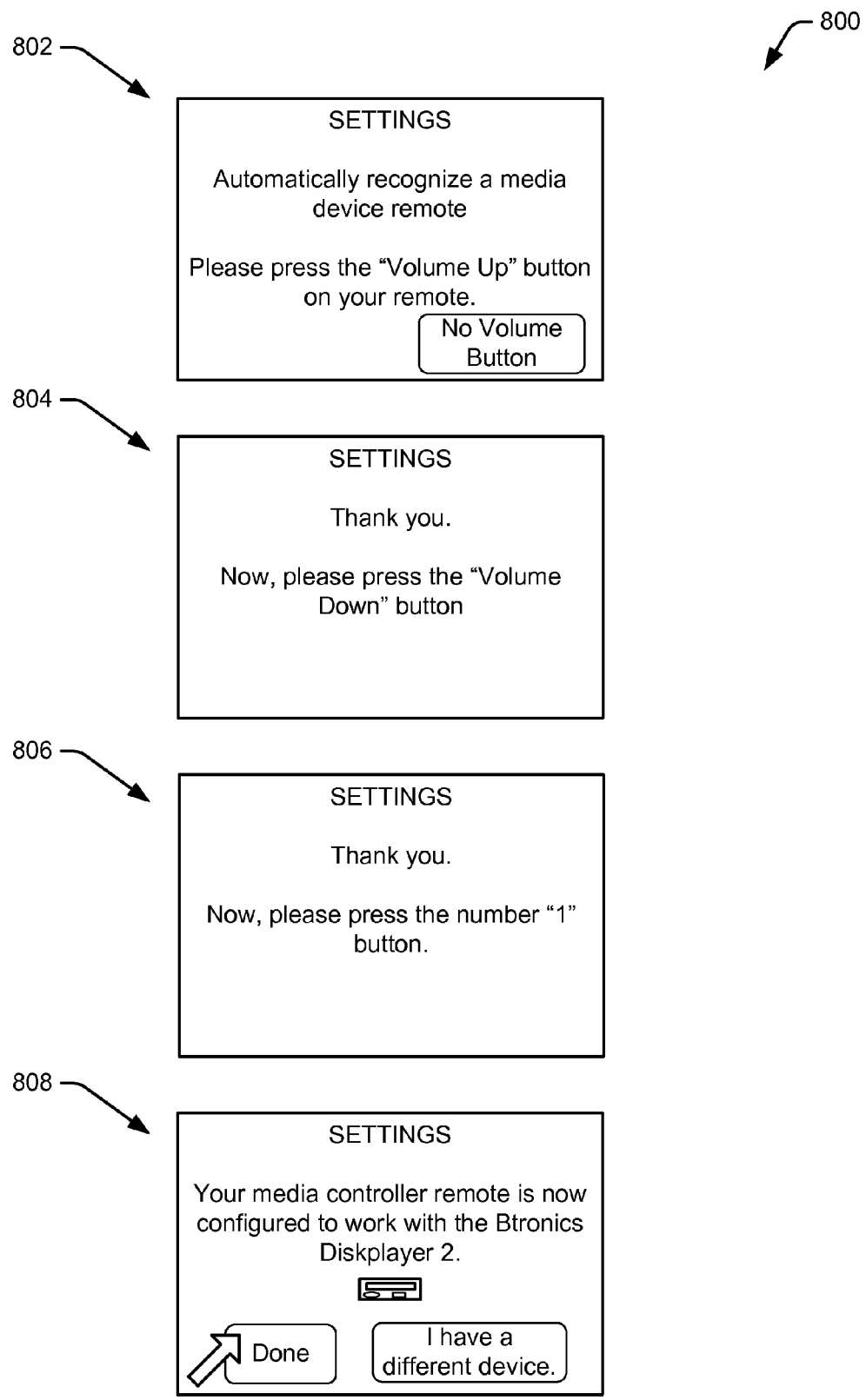
FIG. 8 illustrates a user interface for configuring the media controller remote to control one or more media devices by receiving at the media controller signals from a media device remote.

FIG. 8 illustrates a user interface 800 for configuring the media controller remote 116 to control one or more media devices 104 by receiving at the media controller 110 signals from the media device remote 106. By receiving and interpreting the infrared signals 120 generated by the media device remote 106, the media controller 110 may determine the code table 218 to control the media device 104. As described above, the user interface module 220 of the media controller 110 may be configured to provide the user interface 800.

At 802, the media controller 110 presents the user interface 800 using the television media device 104(1) requesting the user 102 to press the "volume up" button on the media device remote 106. The media controller 110 scans for infrared signals 120 using the infrared interface 210(2). The received signals may be stored for comparison with the infrared signal waveforms 506 stored in the code tables 218.

At 804, the media controller 110 presents the user interface 800 requesting the user 102 to press the "volume down" button on the media device remote 106. The media controller 110 again scans for infrared signals 120 using the infrared interface 210(2). The received signals may be stored for continued comparison with the infrared signal waveforms 506 stored in the code tables 218.

At 806, the media controller 110 presents the user interface 800 requesting the user 102 to press the number "1" button on the media device remote 106. The media controller 110 again scans for infrared signals 120 using the infrared interface 210(2). The received signals may be stored for continued comparison with the infrared signal waveforms 506 stored in the code tables 218. Based at least in part on this comparison, the code table 218 suitable for use with the media device 104 may be determined. Once determined, at least a portion of the code table 218 may be sent to the media controller remote 116 as described above.

At 808, the media controller 110 presents the user interface 800 indicating the media controller remote 116 has been configured. In some implementations, a description of the media device(s) 104 associated with the determined code table 218 may be presented. For example, where the code table 218 has been identified as having a code table identifier 408 of "ZX34," the user interface 800 may indicate that the media device is the "Diskplayer 2." The description of the media device 104 may be based on information retrieved from the code lookup table 216 using the code table identifier 408.

In some implementations the user interface 800 may provide a confirmation prompt, such as asking the user 102 to indicate that the determination of the media device 104 is incorrect. For example, a prompt may comprise a button the user 102 can select when they have a different device.

In another implementation, the infrared interface 210(2) may scan for infrared signals 120. These infrared signals may be monitored to look for infrared signal waveforms 506 corresponding to entries within the code tables 218. Over time, as the user 102 transmits commands from the media device remote 106, the media controller 110 may search the entries within the code tables 218 to determine the code table 218 without prompts or other intentional intervention by the user 102.

Figure 9:
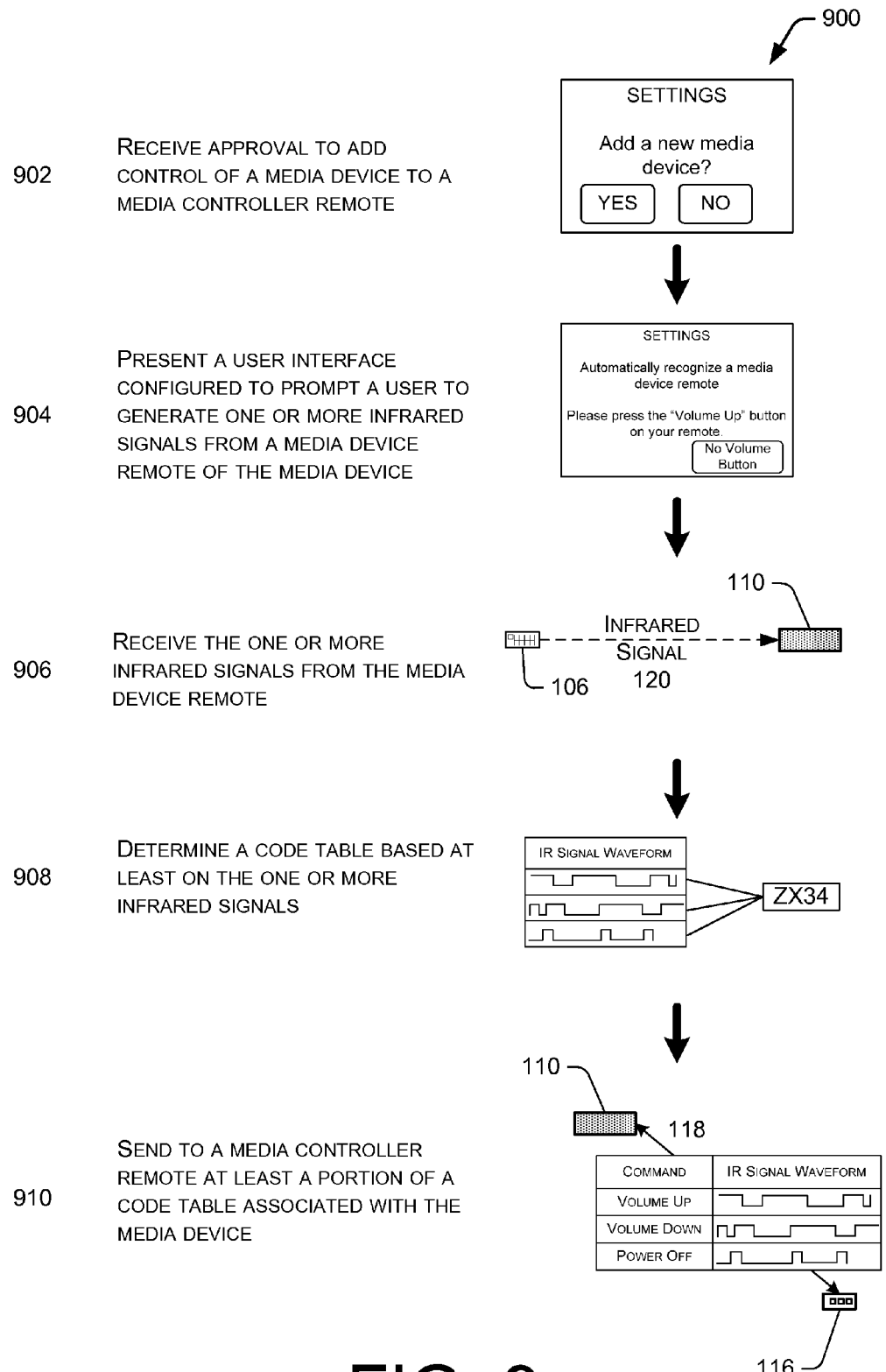
FIG. 9 illustrates a process of configuring the media controller remote to control a media device based at least in part on the received signals.

FIG. 9 illustrates a process 900 of configuring the media controller remote 116 to control the media device 104 based at least in part on the received signals. This process may be implemented at least in part by the infrared device programming module 222.

Block 902 receives approval to add control of the media device 104 to the media controller remote 116. In one implementation, a prompt requesting approval to configure the system to control the media device 104 may be presented in a first graphical user interface on the television media device 104(1). The data for displaying the first graphical user interface and other user interfaces described in this disclosure may be sent using the media device interface 108. This prompt may comprise a control which asks the user 102 for and receives a selection of "yes" or "no" to approve or disapprove the addition of control over the media device 104. The user input to the prompt may be accepted by the media controller remote 116 and provided to the media controller device 110 using the RF signal 118.

In some implementations, block 902 may be omitted. For example, the media controller 110 may be configured to automatically scan for infrared signals 120 and add associated media devices 104 for control.

Block 904, a second user interface 800 is presented which comprises one or more prompts that request the user 102 to enter one or more inputs on the media device remote 106. These inputs, when received by the media device remote 106, generate one or more infrared signals 120 from the media device remote 106. For example, as described above with regard to FIG. 8, the user interface may elicit from the user 102 via the prompts activation of particular buttons on the media device remote 106 at particular times. This eliciting may comprise presenting at least one prompt instructing the 102 user to perform a specific interaction with a media device remote 106 associated with the media device 104. The specific interaction generates the one or more infrared signals 120 detected by the infrared detector of the media controller 110.

In some implementations, block 904 may be omitted. For example, as described above, the media controller 110 may be configured to automatically scan for infrared signals 120.

Block 906 receives one or more infrared signals 120 from the media device remote 106. As described above, the infrared interface 210(2) of the media controller 110 may be configured to receive the infrared signals 120 and store a representation of the infrared signal waveform 506 in the memory 204.

In some implementations block 906 may be configured to operate without prior operation of blocks 902 or 904. For example, the media controller 110 may be configured to monitor for infrared signals and attempt to determine the media device 104 associated with the signals without prompting the user.

Block 908 determines a code table 218 based at least in part on the one or more infrared signals 120. In one implementation, at least a portion of the infrared signal waveforms corresponding to the received signals may be compared with at least a portion of the infrared signal waveforms 506 in a plurality of code tables 218 to find a match. Where the associated command 502 is known, such as where the user 102 has been prompted to press a particular button on the media remote control 106, the command 502 may also be used to search the code tables 218. In some implementations this determination may occur at least in part on a remote device such as the server 114. For example, a portion of the received signals may be sent to the server 114 for determination.

When no code table 218 is determined, a new code table 218(N) may be generated. The user 102 may be prompted with a user interface to issue particular commands on the media device remote 106. For example, the user interface may ask the user to press the numbers 1-9 on a keypad of the media device remote 106 as prompted. Once built, the code table 218(N) may be provided to the server 114, and subsequently distributed to other media controllers 110. As a result, when other users 102 attempt to use the media device 104 with the media controller 110, the code table 218(N) will already be available for use, improving the experience of those subsequent users.

Block 910 sends the media controller remote 116 at least a portion of the code table 216 associated with the media device 104. As described above, the code table 216 or portion thereof may be sent from the media controller 110 to the media controller remote 116 using a radio frequency signal 118 generated by the RF interface 210(1).

Illustrative Process of Controlling Media Device

As described above, the media controller 110 may be configured to control one or more of the media devices 104. Some devices may not be configured to accept control inputs from the media controller 110 using the media device interface 108. The media controller 110 may issue commands to control these media devices 104 using the media controller remote 116 to generate infrared signals 120 which may be received by the media devices 104.

Figure 10:
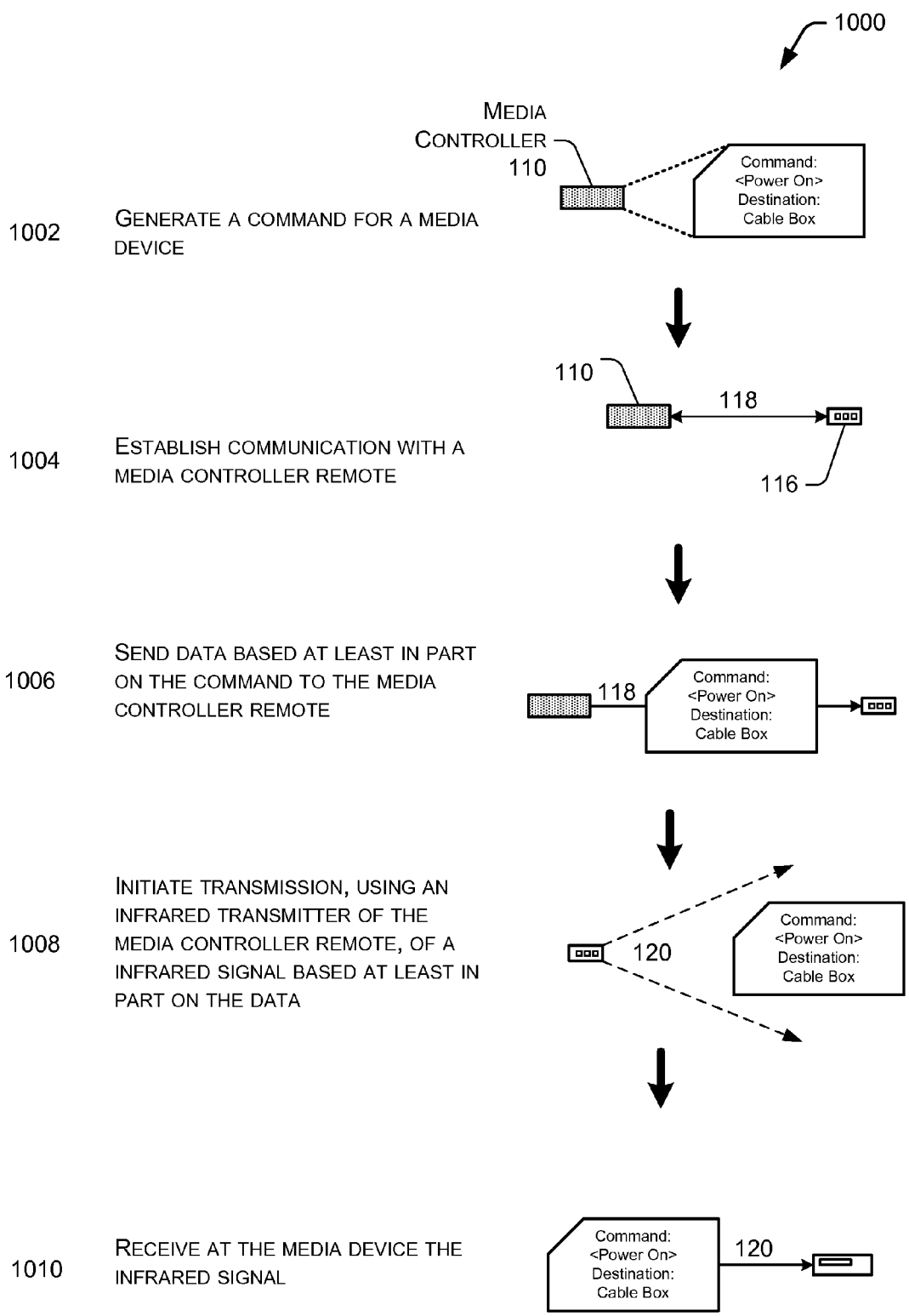
FIG. 10 illustrates a process of sending commands from the media controller to a media device using the media controller remote to generate infrared signals.

FIG. 10 illustrates a process 1000 of sending commands from the media controller 110 to the media device 104 using the media controller remote 116 to generate the infrared signals 120. This process may be implemented by the infrared device control module 224.

Block 1002 generates one or more commands for the media device 104. For example, the infrared device control module 224 of the media controller 110 may generate a command to set the television media device 104(1) to an HDMI input coupled to the DVD player media device 104(2). The one or more commands may be specifically tailored for the media device 104, such as a representation of a particular infrared signal waveform 506. In another implementation, the one or more commands may be more generalized, such as a string or code indicating "power on cable box".

Block 1004 establishes communication with the media controller remote 116. For example, the RF interface 210(1) of the media controller 110 may establish a data connection with the RF interface 310(1) of the media controller remote 116 using the radio frequency signal 118.

Block 1006 sends data based at last in part on the one or more commands to the media controller remote 116. For example, the command to power on the cable box may be sent. As described above, this may be data representative of the one or more commands or may be a particular infrared signal waveform 506.

Block 1008 initiates transmission, using the infrared transmitter of the media controller remote 116 of an infrared signal based at least in part on the data. In one implementation, part of the one or more commands may be processed by the RF to infrared repeater module 318 to use the remote control module 316 to lookup the command in the code table 218 stored in the memory 304 and transmit the corresponding infrared signal waveforms 506 using the infrared interface 310(2).

In another implementation, where the media controller generates the infrared signal waveforms 506 or a representation thereof, the RF to infrared repeater module 318 may omit processing by the remote control module 316 and transmit the infrared signal waveforms 506. In this implementation, the radio frequency signal 118 from the media controller 110 may comprise a signal waveform, or representation of the signal waveform. Based on this received signal waveform, the media controller remote 116 may then modulate the infrared transmitter to reproduce the signal waveform with the infrared transmitter of the infrared interface 310(2) as an infrared signal 120.

Block 1010 depicts the media device 104 receiving the command transmitted by the media controller remote 116. Continuing the example, the cable box media device 104(2) may receive the command and power on.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   a radio frequency interface configured to communicate with a first remote;
   an infrared interface configured to receive one or more infrared signals;
   a media device interface configured to communicate with a display device;
   at least one memory storing computer-executable instructions; and
   at least one processor coupled to the radio frequency interface, the infrared interface, the media device interface, and configured to access the at least one memory and execute the computer-executable instructions to:
      using the media device interface, send, to the display device, data for displaying a first user interface comprising a prompt requesting approval to configure the system to control a media device using input received from the first remote;
      using the radio frequency interface, receive, from the first remote, user input data indicative of approval to configure the system to control the media device using input received from the first remote;
      using the media device interface, send to the display device data for displaying a second user interface comprising one or more prompts that request the user to enter one or more inputs on a second remote;
      using the infrared interface, receive from the second remote one or more infrared signals responsive to the one or more prompts;
      determine an infrared signaling code table comprising commands configured to control the media device, the determination based at least in part on the received one or more infrared signals.

2. The system of claim 1, wherein the determination of the infrared signaling code table comprises comparing at least a portion of the received one or more infrared signals with a code table stored in the at least one memory.

3. The system of claim 1, wherein the media device comprises one or more of a broadcast satellite receiver, broadcast radio receiver, cable television interface box, game console, digital versatile disk ("DVD") player, Blu-Ray™ player, compact disk ("CD") player, or audio system.

4. The system of claim 1, the instructions further configured to cause the at least one processor to send at least a portion of the infrared signaling code table to the first remote using the radio frequency interface.

5. The system of claim 1, the instructions further configured to cause the at least one processor to send data to the first remote using the radio frequency interface, the data configured to cause the first remote to transmit one or more infrared signals to the media device, wherein the transmitted one or more infrared signals are based at least in part on the infrared signaling code table.

6. One or more non-transitory computer-readable media storing computer-executable instructions that, when executed by at least one processor, configure the at least one processor to perform operations comprising:
   receiving, from an infrared detector, one or more signals based on one or more infrared signals detected by the infrared detector and wherein the one or more infrared signals are modulated to encode commands which, when received by a media device, initiate one or more actions on the media device;
   determining an infrared signaling code table from a plurality of infrared signaling code tables based at least in part on the received one or more signals and a manufacturer of the media device, the infrared signaling code table comprising one or more commands configured to control the media device using infrared signals, wherein each infrared signaling code table comprises one or more waveforms of a modulated infrared signal encoding the command; and
   sending at least a portion of the infrared signaling code table to a media controller remote.

7. The computer-readable media of claim 6, the determining the infrared signaling code table comprising comparing at least a portion of a waveform derived from the received one or more signals with a waveform stored in a code table in the one or more computer-readable media.

8. The computer-readable media of claim 6, the infrared signaling code table comprising a command associated with initiating an action on the media device, a pulse-width modulation frequency associated with modulation of an infrared emitter, and a waveform of a modulated infrared signal encoding the command.

9. The computer-readable media of claim 6, the operations further comprising presenting a graphical user interface configured to visually present at least one prompt instructing a user to perform a specific interaction with a media device remote associated with the media device, wherein the specific interaction generates the one or more infrared signals detected by the infrared detector.

10. The computer-readable media of claim 6, the operations further comprising presenting an audio user interface configured to audibly present at least one prompt instructing a user to perform a specific interaction with a media device remote associated with the media device, wherein the specific interaction generates the one or more infrared signals detected by the infrared detector.

11. The computer-readable media of claim 6, further comprising:
   generating, based at least in part on the code table, data comprising the one or more commands configured to control the media device; and
   sending the data to the media controller remote using a first communication interface, wherein the data is configured to, when processed by a processor of the media controller remote, generate one or more signals using a second communication interface.

12. The computer-readable media of claim 11, wherein the first communication interface comprises a radio frequency transceiver and the second communication interface comprises an infrared transmitter.

13. The computer-readable media of claim 11, wherein the data comprises one or more commands or one or more infrared waveforms of modulated infrared signals encoding the one or more commands.

14. A system, comprising:
a first communication interface configured to communicate with a first device;
a second communication interface configured to communicate with a second device;
at least one memory storing computer-executable instructions; and
at least one processor coupled to the first communication interface and second communication interface and configured to access the at least one memory and execute the computer-executable instructions to:
obtain one or more characteristics of the second device, the one or more characteristics comprises a manufacturer of the second device; and
determine a code table associated with the second device using the manufacturer of the second device;
receive, from the first device using the first communication interface, at least a portion of the code table associated with the second device;
receive, using the first communication interface, one or more commands for controlling the second device;
generate, based at least in part on the one or more commands and the code table, one or more signals configured to encode the one or more commands; and
transmit, using the second communication interface, the one or more signals encoding the one or more commands to the second device.

15. The system of claim 14, the generation of the one or more signals further comprising instructions to:
use at least a portion of the one or more commands to look up in the code table one or more signal waveforms which encode the one or more commands, wherein the one or more signal waveforms are associated with the one or more commands; and
generate the one or more signals based at least in part on the one or more signal waveforms associated with the one or more commands.

16. The system of claim 14, wherein the first communication interface comprises a radio frequency transceiver and the second communication interface comprises an infrared transmitter.

17. The system of claim 14, wherein the obtaining the one or more characteristics comprises presenting a user interface configured for the user to enter information about the second device.

18. The system of claim 14, wherein the obtaining the one or more characteristics comprises receiving at an infrared receiver of the first device one or more infrared signals from a second device remote configured to control the second device; and
the determination of the code table comprises comparing waveforms of the one or more infrared signals to the one or more signal waveforms in one or more code tables.

19. The system of claim 14, wherein the obtaining the one or more characteristics comprises receiving, at the first device purchase, information comprising a model number of the second device.

20. The system of claim 14, wherein the obtaining the one or more characteristics comprises receiving data originated at the second device and transferred using a media device interface.

21. The system of claim 14, wherein the first device comprises a media controller device configured to facilitate consumption of content and the second device comprises a media device configured to present or manipulate at least a portion of the content.

22. A handheld device, comprising:
a radio frequency transceiver configured to communicate with a first device;
an infrared transmitter configured to transmit an infrared signal that is configured to communicate with a second device;
at least one memory storing computer-executable instructions;
at least one processor configured to access the at least one memory and execute the computer-executable instructions to:
receive, from the first device, at least a portion of a code table associated with the second device, the code table determined from a plurality of code tables using the manufacturer of the second device;
receive, via the radio frequency transceiver, a radio frequency signal from the first device, the radio frequency signal comprising a signal waveform associated with a command for controlling the second device;
generate, based at least in part on the command and the code table, an infrared signal configured to encode the command; and
modulate an infrared transmitter to reproduce the signal waveform as the infrared signal encoding the command; and
transmit, via the infrared transmitter, the infrared signal encoding the command to the second device.

23. The system of claim 22, wherein the first device comprises a media controller device configured to facilitate consumption of content and the second device comprises a media device configured to present or manipulate at least a portion of the content.

* * * * *